United States Patent [19]
Oehler

[11] 3,819,076
[45] June 25, 1974

[54] SPECIAL PALLET TYPE LOAD TRANSPORT APPARATUS

[76] Inventor: Carl W. Oehler, 2309 S.E. 11th St., Ocala, Fla. 33670

[22] Filed: Oct. 20, 1971

[21] Appl. No.: 190,723

[52] U.S. Cl............... 214/512, 214/515, 280/34 A, 280/425 R, 280/421
[51] Int. Cl............................................. B60p 1/64
[58] Field of Search............ 214/512, 515; 280/402, 280/404, 423 R, 423 A, 421, 425 B, 34 A, 425 R

[56] References Cited
UNITED STATES PATENTS

| | | | |
|---|---|---|---|
| 2,119,800 | 6/1938 | Tull.............................. | 280/423 R X |
| 2,197,401 | 4/1940 | Weber.......................... | 280/421 X |
| 2,847,137 | 8/1958 | Stringfellow.................. | 214/515 |
| 2,900,198 | 8/1959 | Patton.......................... | 280/34 A X |
| 2,996,206 | 8/1961 | McKee......................... | 280/34 A X |
| 3,087,744 | 4/1963 | Tanenbaum................... | 280/404 |
| 3,133,651 | 5/1964 | Cripe............................ | 280/421 X |
| 3,425,576 | 2/1969 | Martin.......................... | 214/515 |
| 3,439,934 | 4/1969 | Murie, Jr. et al............... | 214/515 X |
| 3,520,430 | 7/1970 | Dunbar......................... | 214/512 X |
| 3,527,476 | 9/1970 | Winckler...................... | 280/5 C X |

Primary Examiner—Albert J. Makay
Attorney, Agent, or Firm—Oldham & Oldham Co.

[57] ABSTRACT

A combination tractor-trailer and for use with a pallet load carrying assembly is provided. The trailer and tractor fifth wheel both have vertically movable, controllable, load support or lift means associated therewith and the trailer is of improved, sturdy design to facilitate connection of power means to the trailer lift means, whereby the trailer can readily be connected to or disconnected from the tractor. The power means include protected electrical and pressure supply lines on the trailer at its front end. The trailer and supply lines are of variable effective length.

4 Claims, 6 Drawing Figures

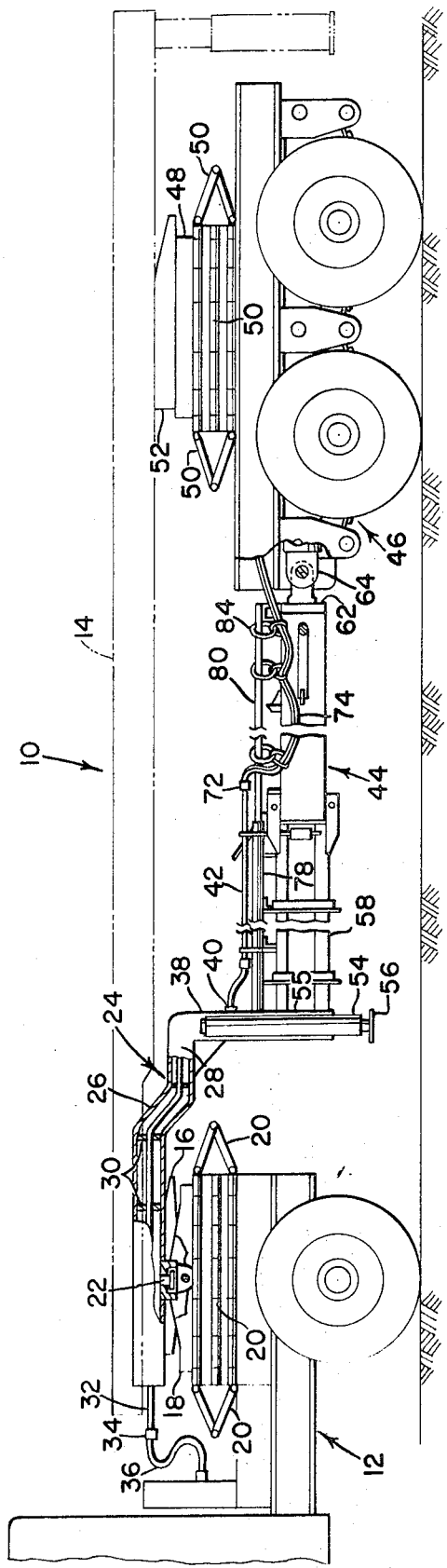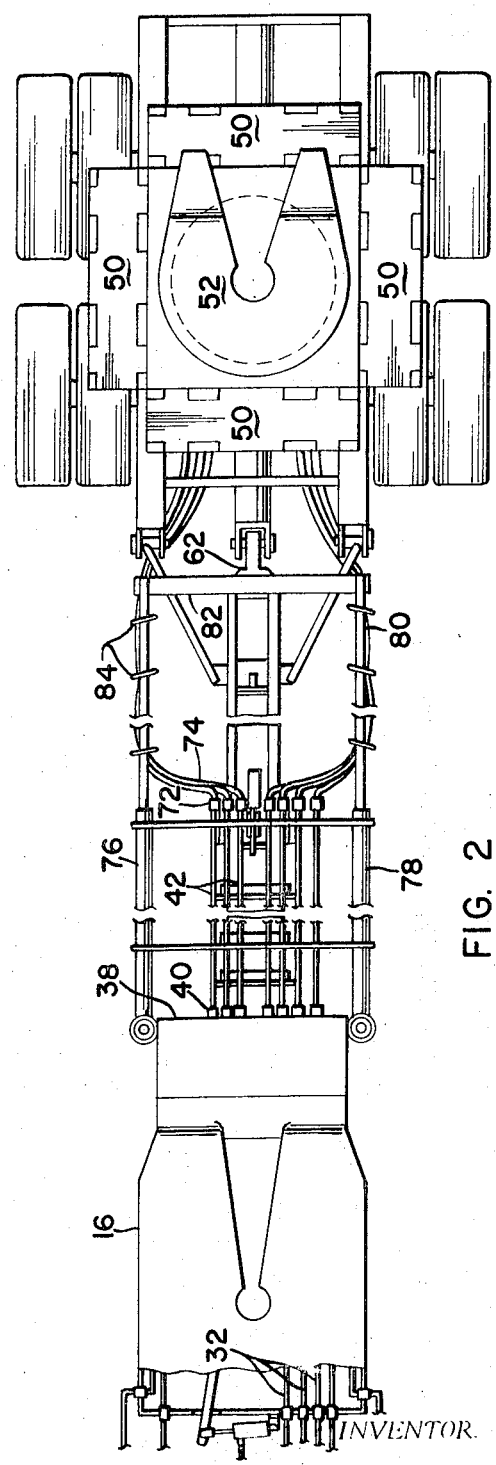

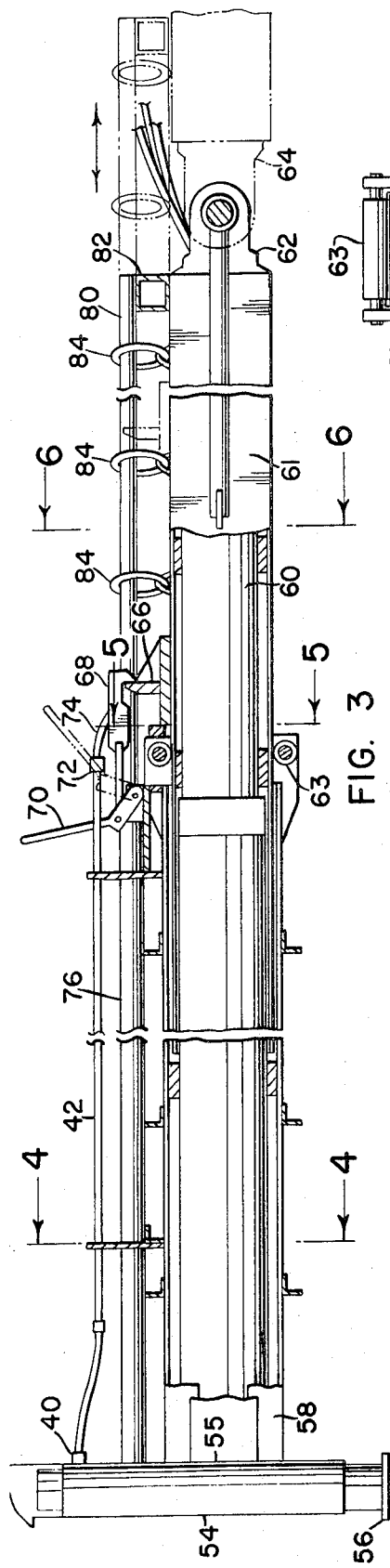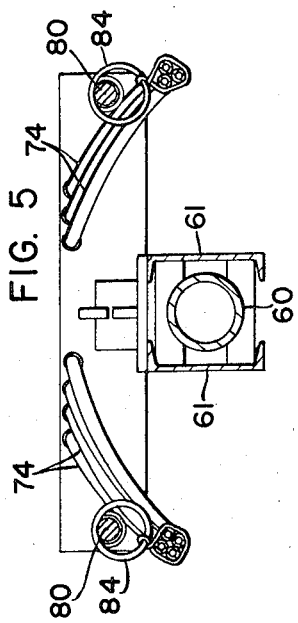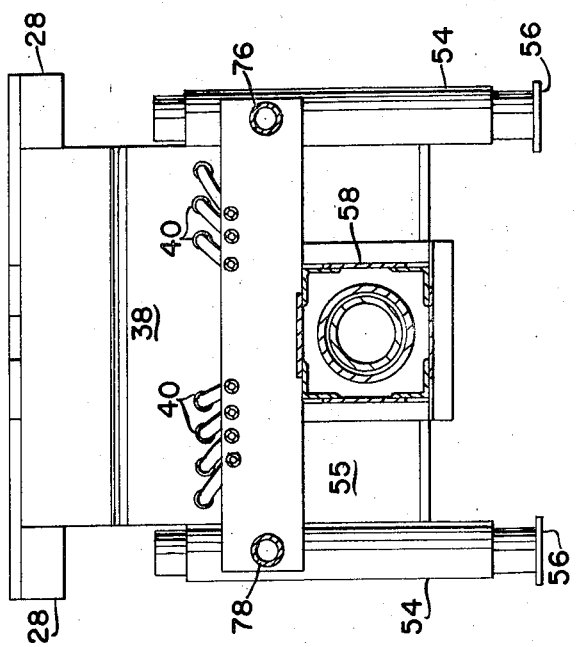

SPECIAL PALLET TYPE LOAD TRANSPORT APPARATUS

The present invention relates in general to pallet type load support and load transport apparatus, and is particularly concerned with the provision of a sturdy trailer readily connectable to the tractor for supply of power and/or pressure fluid therefrom and including the use of lines positioned within the trailer at its front end.

OTHER ASSOCIATED APPLICATIONS

Reference is made to my co-pending applications Ser. Nos. 61,228, filed Aug. 5, 1970 and 110,486, filed Jan. 28, 1971 wherein the overall type of a pallet, and tractor-trailer type of a load transport system is fully described and means for providing this functioning are disclosed in detail.

BACKGROUND OF THE INVENTION

The present invention particularly relates to improved load transport means involving pallets for supporting loads and wherein the trailer of a tractor-trailer combination can be moved in under the pallet, the lifting members on the trailer be energized and the pallet lifted for transport by the tractor-trailer combination and for discharge at any selected point. Hence, the tractor-trailers are not tied up by use conditions and/or by load assembly and load removal functions.

The general object of the present invention is to provide a novel and improved trailer particularly adapted for use in tractor-trailer combinations for pallet load transport action.

Another object of the invention is to provide a sturdy, improved trailer of a good service life and which can be made at reasonable expense and provide very desirable load lifting and load lowering actions.

Another object of the invention is to facilitate connection and supply of pressure fluids to a trailer of a tractor-trailer combination, especially of the type referred to hereinbefore, and/or where the trailer is of adjustable length.

A further object of the invention is to provide pressure supply lines that are positioned within the frame of a box-type trailer section whereby metal or sturdy fluid pressure transmitting lines can be permanently positioned within the trailer section to extend at least a portion of the length thereof and to have conventional coupling means at the front end of the trailer for ready connection to or disengagement from associated fluid pressure supply means permanently affixed to the tractor.

The foregoing and other objects and advantages of the invention will be made more apparent as the specification proceeds.

Reference now is particularly made to the accompanying drawings, wherein:

FIG. 1 is a side elevation, partially broken away, of a trailer embodying the principles of the invention showing it in combination with a tractor and with pallet means being diagrammatically indicated in the combination;

FIG. 2 is a plan view of a trailer of FIG. 1;

FIG. 3 is a fragmentary enlarged side view of a portion of the trailer of FIG. 1 with some of the members being shown in vertical section;

FIG. 4 is a fragmentary vertical section taken on line 4—4 of FIG. 3 with the front portion of the trailer being shown in elevation;

FIG. 5 is a fragmentary vertical section through the cylinder means taken on line 5—5 of FIG. 3; and FIG. 6 is a fragmentary vertical section taken on line 6—6 of FIG. 3 showing the fluid pressure and electrical conduit means.

When referring to corresponding members shown on the drawing and referred to in the specification, corresponding numerals are used to facilitate comparison therebetween.

SUMMARY OF THE INVENTION

This invention relates to a trailer particularly adapted for use in a pallet type load transfer apparatus and wherein the trailer includes a front frame section normally of gooseneck shape and adapted to engage at its front end to a fifth wheel assembly on a tractor, a center pole means connecting to the frame section forming a frame means for the trailer, a wheel means assembly secured to the rear end of the center pole means, a load support platform on the wheel means assembly, and an inflatable means connecting the load support platform to the wheel means assembly to raise and lower such platform for engaging and supporting or lowering a rear end of a pallet which can be carried by the apparatus. Additionally, the front frame section includes fluid pressure conduit means permanently secured thereto, additional fixed pressure fluid conduit means extending a portion of the length of the center pole means, and flexible pressure fluid conduit means extend from the fixed pressure fluid conduit means to terminate adjacent the rear end of the trailer to connect to the wheel means assembly and provide operative pressure fluids thereto.

Attention now is directed to the details of the structure shown in the drawing, and a trailer is indicated as a whole by the numeral 10. This trailer is of the type that is adapted to be used in association with a prime mover, such as a tractor 12, and the trailer is especially adapted for use in pallet type load transport apparatus wherein a member such as a pallet 14 is used for receiving load (not shown) thereon. This pallet 14 is usually self supporting whereby the trailer 10 can be moved in under the pallet for laod lift and transport action. The tractor 12 includes a conventional fifth wheel 16 which is pivotally supported on a load support plate 18 that is movable vertically of the tractor 12 as by an inflatable member (not shown), in association with piano hinge means 20, all as more fully described in my co-pending application Ser. No. 110,486.

The trailer has a kingpin 22 or other conventional means thereon that is adapted to engage with the fifth wheel 16 secured to the tractor for securing these members in operative relationship with each other in a known manner. The trailer 10 includes a frame means having as a front frame section a more-or-less gooseneck shaped unit 24 which unit or frame section can be of an open center or box type construction as desired, and wherein a top plate 26 and side plates 28 are provided whereby a protected enclosure is formed by the frame section 24. Transversely extending reenforcing members or bars 30 usually are welded or otherwise secured to the top plate and side plates to form a sturdy load transport and carrying section for the trailer.

It is an important feature of the present invention that fixedly or permanently positioned pressure fluid conduit lines 32 of any suitable construction and number as required in the trailer are provided in longitudinally aligned, transversely spaced relationship across the frame section. These conduits or lines 32 terminate in conventional, quickly releasable coupling means 34 for connection to associated pressure or fluid supply lines 36 operatively carried by and available on a rear portion of the tractor 12. Hence, compressed air and/or hydraulic pressure liquids and fluids can be supplied to the trailer 10 through the plurality of conduits 32, as described hereinafter in more detail. These conduits 32 extend the effective length of the frame section 24 and normally extend downwardly a short distance in a vertically extending rear wall 38 of this frame section 24. Such rear wall also is of a sturdy box type construction and the conduits 32, which can be made from metal pipes, plastic material, or other suitable substances as desired, then preferably extend out through the surface of the rear wall 38 as by or at fittings 40 secured to this rear wall 38. A number of connecting fluid conduits 42 individually connect to the different conduits 32 and these conduits 42, which can be made from metal tubes or other suitable material, extend in permanently affixed positions a distance rearwardly of the trailer 10 from this rear wall 38 of the frame section 24.

The drawings clearly bring out that the trailer 10 includes as a portion thereof, a center pole or frame means which in this instance includes a cylinder indicated as a whole by the numeral 44 whereby the effective length of the trailer 10 can be varied. This center pole member or frame means of the invention is pivotally secured at its rear end to a wheel means assembly 46 which has a load support platform 48 positioned thereon. The drawings indicate that the support plate 48 is positioned for vertical movement on the wheel assembly means 46 by suitable members including piano hinges 50 and an inflatable member, not shown, received within an enclosure provided by the piano hinges all in a manner as described in my co-pending application Ser. No. 110,486. The load support plate 48 positions a fifth wheel 52 thereon for engaging a kingpin (not shown) provided on a rear portion of the pallet 14 or the load support plate 48 may otherwise suitably engage with a lower portion of the pallet to lift and support the same.

The rear wall 38 and enclosure means associated therewith of the frame section may operatively position a support cylinder 54 thereon whereby an extensible foot 56 extends therefrom carried by the piston rod for supporting the trailer 10 when disengaged from the tractor 12. Any desired controls can be provided for actuation of this cylinder 54, normally one or more of the conduits 32 connecting thereto for pressure actuation and control thereof.

The fifth wheel 52 may be of standard or modified construction, as desired. The pallet 14 has adjustable support legs thereon. While one support cylinder 54 and boot 56 has been referred to before, FIG. 4 shows that one such cylinder is provided at each lateral margin of the trailer. These cylinders 54 can be used to lift or lower the front end of the trailer whereby the lift means 20 can be eliminated. The invention also contemplates the provision of an electric powered fluid pump, usually a hydraulic pump (not shown) on the trailer. The electric power would be provided on the trailer by one of the conduits 32 connecting to a power supply on the tractor. The fluid pump would be manually controlled or be controlled from the tractor, as desired, but with a complete pressure system being provided on the trailer. Hence, the raising and lowering of the trailer front end by the cylinders 54 and their piston rods can readily be affected and it can be engaged with or disengaged from the fifth wheel 16 by the cylinders.

By the use of the cylinder 44 as a portion of the center pole means or frame of the trailer 10 and in order to obtain high strength and a sturdy trailer design, FIG. 4 of the drawings shows that the cylinder 44 is received within an open centered beam or reenforcing means 58. One end of this beam is suitably secured to the rear wall 55 of the front frame section and the beam extends rearwardly of the apparatus to position the cylinder 44 therein in a fixed manner. This piston rod or plunger 60 extending from the cylinder 44 preferably is substantially as long as the cylinder 44 and with the cylinder being, preferably, double acting so that the piston rod extends rearwardly of the trailer and terminates in a suitable member, such as a bracket or clevis. This bracket 62 is secured to a similar bracket or clevis 64 on the wheel means assembly for pivotally securing the rear end of the piston rod to the wheel means assembly for relative movement therebetween.

Usually the piston rod 60 has a suitable lock bracket 66 secured thereto with which a locking finger 68 is adapted to engage when the piston rod is in its retracted position. This locking finger 68 in turn is controlled by a lever 70 pivotally secured to the rear end of the beam 58 whereby the piston rod can be locked in retracted position for transport of the trailer 10 when desired. Of course, the locking lever is releasable to permit extension of the piston rod when desired.

Preferably the piston rod or plunger 60 has a pair of reenforcing channels 61 suitably secured thereto and extending along the exposed length thereof. These channels 61 engage rollers 63 journalled on the rear end of the beam 58 to facilitate extension and retraction of the plunger 60 and means attached thereto.

For a modification of the trailer the cylinder 44 and plunger 60 could have two telescoping beams substituted therefor and being locked in a given position by a lock pin or bolt extending through any of a plurality of alignable holes provided in the beams at longitudinally spaced portions thereof. These beams could be telescoped manually or by movement of the tractor attached to the trailer. Such telescoping beams would be the center pole means of the trailer.

The conduits 42 which are secured to and carried by the beam 58 have suitable fittings 72 on their rear ends and they connect to individual flexible fluid conduits 74 that in turn extend to and are suitably connected to known types of hydraulic and fluid pressure receiving means carried by the wheel means assembly 46 for pressure actuation of members thereon.

Since the length of the trailer may be varied, the invention contemplates providing a pair of auxiliary cylinders 76 and 78 that are suitably secured to and carried as a unit with the beam 58 with one cylinder being on each side thereof. These auxiliary cylinders have piston rods 80 extending therefrom and they are attached at their rear ends to a cross bar 82 that is secured to the piston rod 60 at its rear end and extends perpendicularly thereto whereby a unit is formed from the piston rods 60 and 80 to compensate automatically for any change in length of the trailer. So as to support the flexible conduits 74 at all times, a plurality of members, such as rings 84, are loosely engaged with the individual piston rods 80 and have the flexible conduits 74 threaded through. Thus the pressure conduits 74 are supported at all times during operative and transport conditions.

The trailer can carry a pallet in either an elevated or lowered position and the length of the pallet support legs would be correspondingly varied.

It will be realized that air or hydraulic pressure is required in the wheel assembly means for brake operation, for inflation of the inflatable cylinder provided for lifting the load support platform, and that electrical conduits may be required for the electrical signals on the wheel means assembly, etc. so that the flexible and fixed conduits may be for electrical leads as well as for pressure fluids or liquids. Any number of such conduits as required may be used. Or the conduits may enclose electrical control as well as power leads. By providing a pressure pump on the trailer, the number of connectable leads or lines extending from the trailer to the tractor may be reduced.

By the construction of the invention, a sturdy pallet type load transport trailer has been provided and the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In a pallet type load transport apparatus, a trailer adapted to be secured to a tractor and comprising
    a front frame section, a center pole means and a wheel means assembly secured to the rear end of said center pole means, a load support platform on said wheel means assembly, and an inflatable means connecting said load support platform to said wheel means assembly to raise and lower the platform to engage and support the rear end of a pallet,
    said front frame section being adapted to be coupled to the fifth wheel to said tractor,
    rigid conduit lines affixed to said front frame section and extending the length thereof and being adapted to be coupled to means on a tractor; said center pole means including a longitudinallly extensible cylinder and additional flexible conduit means connect between said conduit lines and said inflatable means; and a pair of auxiliary piston and cylinder means are parallel with and operatively connected to said center pole means and means support said flexible conduit means on the piston rods of said cylinder means.

2. In a pallet type load transport apparatus, a trailer comprising
    a front frame section, a center frame means and a wheel assembly means is secured to the rear end of said center frame means, a load support platform on said wheel means assembly, and an inflatable means connecting said load support platform to said wheel means assembly to raise and lower the platform to engage and support the rear end of a pallet, and
    said front frame section being adapted to be coupled to the fifth wheel to a tractor for movement of the trailer, and
    pressure fluid conduit lines affixed to said front frame section and extending the operative length thereof, said conduit lines being positioned within an enclosure formed by said front frame section, said center frame means including a longitudinally extensible beam, other conduit sections connecting to said conduit lines permanently secured to said beam and extending longitudinally thereof, and flexible fluid conduit means connecting between said other conduit sections and said wheel means assembly to supply power thereto.

3. In a pallet type load transport apparatus as in claim 2 where a pair of auxiliary piston and cylinder means are operatively connected to spaced relatively movable portions of said center pole means, and means support said flexible conduit means on said auxiliary piston and cylinder means.

4. In a pallet type load transport apparatus as in claim 2 where a pair of vertically positioned hydraulic cylinders are provided at opposite lateral margins of a front portion of the frame and they control piston rods with supports thereon for engaging the ground and being operable to raise and lower the front end of the trailer; and a hydraulic pump and drive motor therefor are provided on the trailer and they connect to a hydraulic system on the trailer and to said hydraulic cylinders to control the elevation of the front end of the trailer, one of said conduit lines containing electric power leads connecting to said drive motor.

\* \* \* \* \*